United States Patent
Suda

(10) Patent No.: US 7,149,555 B2
(45) Date of Patent: Dec. 12, 2006

(54) MOBILE PHONE CAPABLE OF STOPPING MAIN CLOCK SIGNAL

(75) Inventor: Kei Suda, Tokyo (JP)

(73) Assignee: NEC Electronics Corporation, Kanagawa (JP)

(*) Notice: Subject to any disclaimer, the term of this patent is extended or adjusted under 35 U.S.C. 154(b) by 639 days.

(21) Appl. No.: 09/994,961

(22) Filed: Nov. 27, 2001

(65) Prior Publication Data

US 2002/0065117 A1   May 30, 2002

(30) Foreign Application Priority Data

Nov. 29, 2000   (JP) .............................. 2000-362968

(51) Int. Cl.
*H04M 1/00* (2006.01)
*H04B 1/38* (2006.01)

(52) U.S. Cl. ...................... 455/574; 455/343; 455/550; 455/522

(58) Field of Classification Search ................ 455/574, 455/343.1, 343.2, 343.3, 343.4, 343.5, 343.6, 455/343, 550, 522, 127, 208, 259, 265
See application file for complete search history.

(56) References Cited

U.S. PATENT DOCUMENTS

| 5,943,613 A * | 8/1999 | Wendelrup et al. ....... 455/343.1 |
| 6,029,061 A * | 2/2000 | Kohlschmidt ............... 455/574 |
| 6,044,282 A * | 3/2000 | Hlasny ....................... 455/574 |
| 6,219,531 B1 * | 4/2001 | Roberts et al. ............... 455/73 |
| 6,542,727 B1 * | 4/2003 | Kikuchi ...................... 340/7.33 |
| 6,564,046 B1 * | 5/2003 | Chateau ..................... 340/7.32 |
| 6,650,189 B1 * | 11/2003 | Romao ........................ 331/49 |
| 6,725,067 B1 * | 4/2004 | Marx et al. ................. 455/574 |

FOREIGN PATENT DOCUMENTS

| CN | 1224322 A | 7/1999 |
| EP | 0 758 768 A2 | 2/1997 |
| EP | 0 865 167 A2 | 9/1998 |
| EP | 0 939 495 A1 | 9/1999 |
| GB | 2 324 681 A | 10/1998 |
| GB | 2 329 795 A | 3/1999 |
| GB | 2 35 7 671 A | 6/2001 |
| JP | 60-137147 | 7/1985 |
| JP | 8-251656 | 9/1996 |
| JP | 11-183661 | 7/1999 |

* cited by examiner

*Primary Examiner*—Matthew D. Anderson
*Assistant Examiner*—Tuan Pham
(74) *Attorney, Agent, or Firm*—Scully, Scott, Murphy & Presser, P.C.

(57) ABSTRACT

A mobile phone has at least one main clock system and operating based on a main clock signal of the main clock system. The main clock system includes a main counter for counting main clocks of the main clock signal; and a power saving section for stopping generation of the main clock signal for a time period, while counting wait clocks of a wait clock signal, for restarting the generation of the main clock signal after the time period, and for controlling the main counter the main counter based on the counted wait clocks as if the main counter always counts the main clocks of the main clock signal.

20 Claims, 5 Drawing Sheets

MOBILE PHONE CAPABLE OF STOPPING MAIN CLOCK SIGNAL

BACKGROUND OF THE INVENTION

1. Field of the Invention

The present invention relates to a mobile phone, and more particularly to a technique which suppresses power consumption in a waiting operation of a mobile phone.

2. Description of the Related Art

Conventionally, a mobile phone has been come into a practical use. In the mobile phone, a waiting operation peculiar to the mobile phone is carried out in addition to a usual operation such as speech communication and data communication. A substantial function of the mobile phone is not realized during the waiting operation. Therefore, a control is carried out during the waiting operation to prevent power consumption of a battery.

A control unit used in a conventional mobile phone will be described with reference to FIG. 1. The conventional control unit is composed of a central processing unit (CPU) 10, a main clock generator 11, a wait clock generator 12, a wait timer 13 and a main counter 14.

The main clock generator 11 generates a main clock signal to operate the control unit and supplies to the CPU 10 and the main counter 14. The CPU 10 operates in response to the main clock signal to control the whole control unit of the mobile phone. The main counter 14 carries out a counting operation in response to the main clock. The CPU 10 controls communication between a base station and the mobile phone in accordance with the count value of the main counter 14.

The wait clock generator 12 generates a wait clock signal and supplies to the wait timer 13. The wait timer 13 operates in response to the wait clock. The wait timer 13 generates a start signal and supplies to the main clock generator 11. Also, the wait timer 13 generates an interruption signal and supplies to the CPU 10. Thus, the wait timer 13 controls an operation before and after a waiting operation.

In the above configuration, the operation of the control unit of the conventional mobile phone will be described. The CPU 10 specifies a wait time before entering the waiting operation, and then issues a main clock stop instruction to the main clock generator 11. Also, the CPU 10 issues a wait timer start instruction to the wait timer 13. By this, the main clock generator 11 stops the generation of the main clock signal. As a result, the CPU 10 enters a sleep mode and the counting operation of the main counter 14 is stopped.

When the specified wait time elapses in the sleep mode, the wait timer 13 supplies a start signal to the main clock generator 11 to restarts the main clock generator 11 and supplies an interruption signal to the CPU 10 to restart the operation of the CPU 10. Thus, the counting operation of the main counter 14 is restarted and the CPU 10 can communicate with a base station in accordance with the count value of the main counter 14. The power consumption of a battery can be suppressed because the main clock signal is stopped in the waiting operation through above operation. However, the count value of the main counter becomes discrete before and after the waiting operation.

By the way, in the frequency division multiple access (FDMA) and the time division multiple access (TDMA) which are adopted in the conventional mobile phone, because the status of the CPU can be generally changed from the waiting operation in accordance with the reception of electric wave from the base station, there is not a problem, even if the count value of the main counter become discrete.

Also, in the mobile phone of the code division multiple access (CDMA) system, continuity of the count value of the main counter before and after the waiting operation is required. However, the main clock signal is low in frequency and is near the frequency of the wait clock signal. For this reason, it is possible to correct the count value of the main counter by searching for a few clocks to maintain the continuity of the count value of the main counter.

However, in the wide band—code division multiple access (W-CDMA), because the frequency of a main clock signal is high considerably, compared with the frequency of the wait clock. For this reason, it is impossible to correct the count value of the main counter to maintain the continuity of the count value before and after the waiting operation. Moreover, in the W-CDMA system, it is not possible to carry out communication if the count value of the main counter is shifted by one clock. Therefore, in the W-CDMA system, it is necessary that the main clock signal is not stopped even during the wait operation or the communication synchronization with the base station is established again after the wait operation.

If it is supposed that the main clock signal is not stopped during the wait operation, the power consumption during the wait operation becomes larger tens of times, compared with the case where the main clock signal is stopped. Also, if it is supposed that the communication synchronization is established again after the wait operation, a process time after the wait operation becomes 10 times or more, resulting in increase of the power consumption.

SUMMARY OF THE INVENTION

Therefore, an object of the present invention is to provide a mobile phone in which the power consumption can be suppressed.

Another object of the present invention is to provide a mobile phone in which a main clock signal can be stopped during a waiting operation.

Still another object of the present invention is to provide a mobile phone in which a process time after a waiting operation can be decreased.

In an aspect of the present invention, a mobile phone has at least one main clock system and operating based on a main clock signal of the main clock system. The main clock system includes a main counter for counting main clocks of the main clock signal; and a power saving section for stopping generation of the main clock signal for a time period, while counting wait clocks of a wait clock signal, for restarting the generation of the main clock signal after the time period, and for controlling the main counter the main counter based on the counted wait clocks as if the main counter always counts the main clocks of the main clock signal.

Here, the power saving section may include a stop control section, a correction control section and a restart control section. The stop control section stops the generation of the main clock signal. The correction control section counts the wait clocks of the wait clock signal for the time period during which the generation of the main clock signal is stopped, and corrects a count value of the main counter based on the counted wait clocks. The restart control section restarts the generation of the main clock signal after the time period elapses, such that the main counter counts the main clocks from the corrected count value.

Also, it is desirable that the frequency of the main clock signal is larger than a frequency of the wait clock signal.

Also, the time period during which the generation of the main clock signal is stopped is desirably predetermined.

Also, the correction control section may include a counting section for counting the wait clocks of the wait clock signal for the time period during which the generation of the main clock signal is stopped; a calculating section for calculating the main clocks while the generation of the main clock signal is stopped; and a setting section for correcting the count value of the main counter based on the calculated main clocks. In this case, the calculating section may include a ratio section, a read section and another section. The ratio section determines a frequency ratio of a frequency of the main clock signal to a frequency of the wait clock signal. The read section reads out a count value from the main counter when the generation of the main clock signal is stopped. The other section calculates the main clocks while the generation of the main clock signal is stopped, based on the counted wait clocks of the wait clock signal.

At this time, the mobile phone may further include a battery; and a first driving section for driving the ratio section when a voltage of the battery changes. Otherwise, the mobile phone may further include a temperature sensor; and a second driving section for driving the ratio section when the temperature sensor senses change of a temperature of the mobile phone.

Also, the mobile phone may include first and second main clock systems, each of which is configured as mentioned above. In this case, the wait clock signal is shared by the first and second main clock systems.

In another aspect of the present invention, a mobile phone has at least one main clock system. The main clock system includes a main clock generator which generates a main clock signal; a main counter which carries out a counting operation of main clock of the main clock signal in response to the main clock signal generated by the main clock generator; and a processor which stops the counting operation of the main counter by stopping the generation of the main clock by the main clock generator before entering a waiting operation and changes a count value of the main counter as if the counting operation of the main counter has been not stopped when going out of the waiting operation.

Here, the processor may include a wait timer which carries out a counting operation of wait clocks of a wait clock signal in response to a wait clock signal for a predetermined time corresponding to a time period during which the generation of the main clock signal is stopped; and a CPU which operates based on the count value of the main counter in response to the main clock signal. In this case, the wait timer may stop the operations of the main counter and the CPU by stopping the generation of the main clock signal by the main clock generator in response to an instruction from the CPU. Also, the wait timer may control the main clock generator to restart the generation of the main clock signal and the CPU to change a count value of the main counter, after the predetermined time elapses.

Also, the CPU may change the count value of the main counter by adding data corresponding to the number of the main clocks while the counting operation of the main counter is stopped, to the count value of the main counter. In this case, the CPU may calculate the data to be added, based on the wait clocks counted by the wait timer during the predetermined time. Also, the processor may further include a clock precision unit which holds a ratio of a frequency of the main clock signal to a frequency of the wait clock signal. The CPU calculates the data by multiplying the wait clocks counted by the wait timer by the ratio held by the clock precision measuring unit.

Also, it is desirable that the predetermined time is set in the wait timer by the CPU before the wait timer stops the generation of the main clock signal by the main clock generator.

In still another aspect of the present invention, a mobile phone has two main clock systems, each of which include a main clock generator which generates a main clock signal; a main counter which carries out a counting operation of main clock of the main clock signal in response to the main clock signal generated by the main clock generator; and a processor which stops the counting operation of the main counter by stopping the generation of the main clock by the main clock generator before entering a waiting operation and changes a count value of the main counter as if the counting operation of the main counter has been not stopped when going out of the waiting operation.

Here, the processor may include a wait timer which carries out a counting operation of wait clocks of a wait clock signal in response to a wait clock signal for a predetermined time corresponding to a time period during which the generation of the main clock signal is stopped; and a CPU which operates based on the count value of the main counter in response to the main clock signal.

Also, the wait timer may be shared by the two main clock systems.

In yet still another aspect of the present invention, a method of saving power consumption in a mobile phone having at least one main clock system and operating based on a main clock signal of the main clock system, is attained by (a) counting main clocks of the main clock signal; by (b) stopping generation of the main clock signal for a time period, while counting wait clocks of a wait clock signal; by (c) restarting the generation of the main clock signal after the time period; and by (d) restarting the counting operation of the main clock of the main clock signal from preset data corresponding to the counted wait clocks of the wait clock signal.

The step (b) may be attained by (e) counting the wait clocks of the wait clock signal for the time period; by (f) calculating the preset data based on a count value of the main counter based on the counted wait clocks of the wait clock signal; and by (g) setting the preset data.

Also, the frequency of the main clock signal is desirably larger than the frequency of the wait clock signal, and the time period is desirably predetermined.

Also, the step (f) may be attained by (h) determining a frequency ratio of a frequency of the main clock signal to a frequency of the wait clock signal; by multiplying the counted wait clocks of the wait clock signal by the frequency ratio; and by adding the counted main clocks when the generation of the main clock signal is stopped, to the multiplying result. In this case, the method may further include the step of: carrying the step (h) when a voltage of a battery changes, or carrying the step (h) when a temperature of the mobile phone changes.

DESCRIPTION OF THE PREFERRED EMBODIMENTS

Hereinafter, a mobile phone of the present invention will be described in detail with reference to the drawings.

Figure 1:
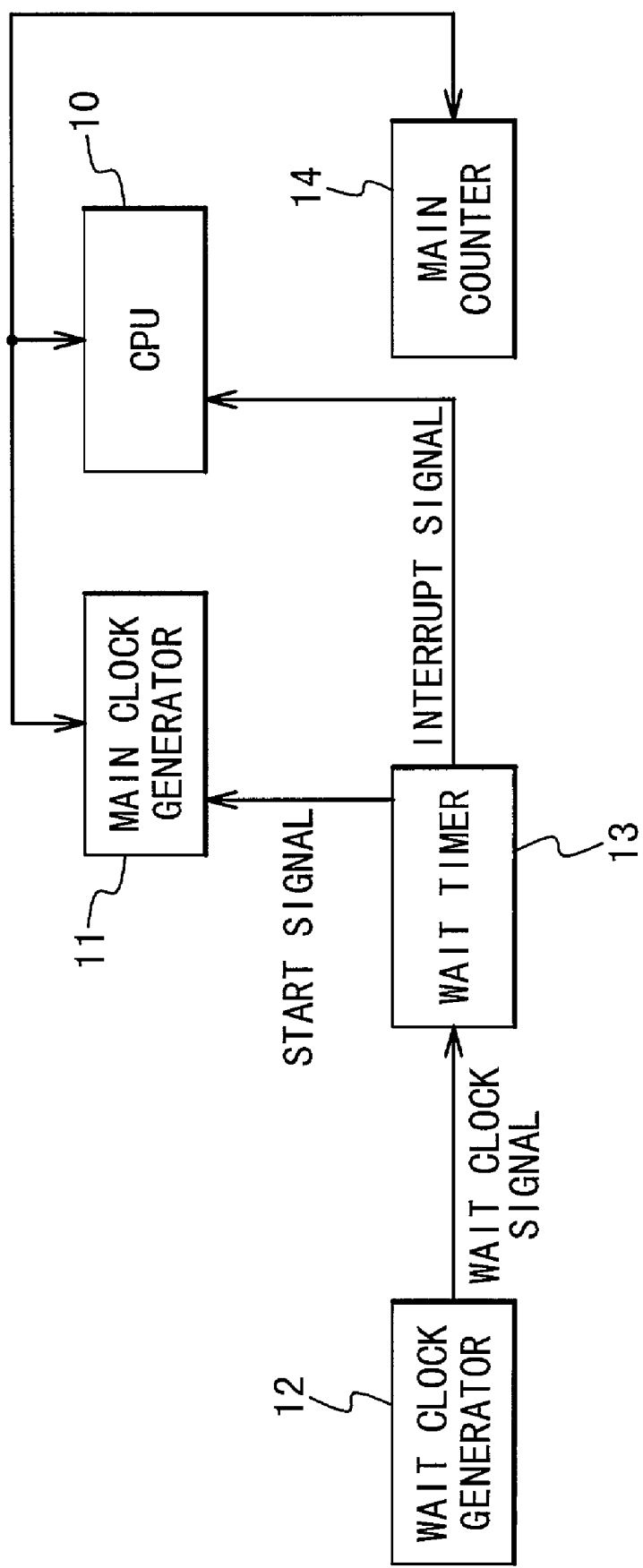
FIG. 1 is a diagram showing the circuit structure of a conventional mobile phone.
Figure 2:
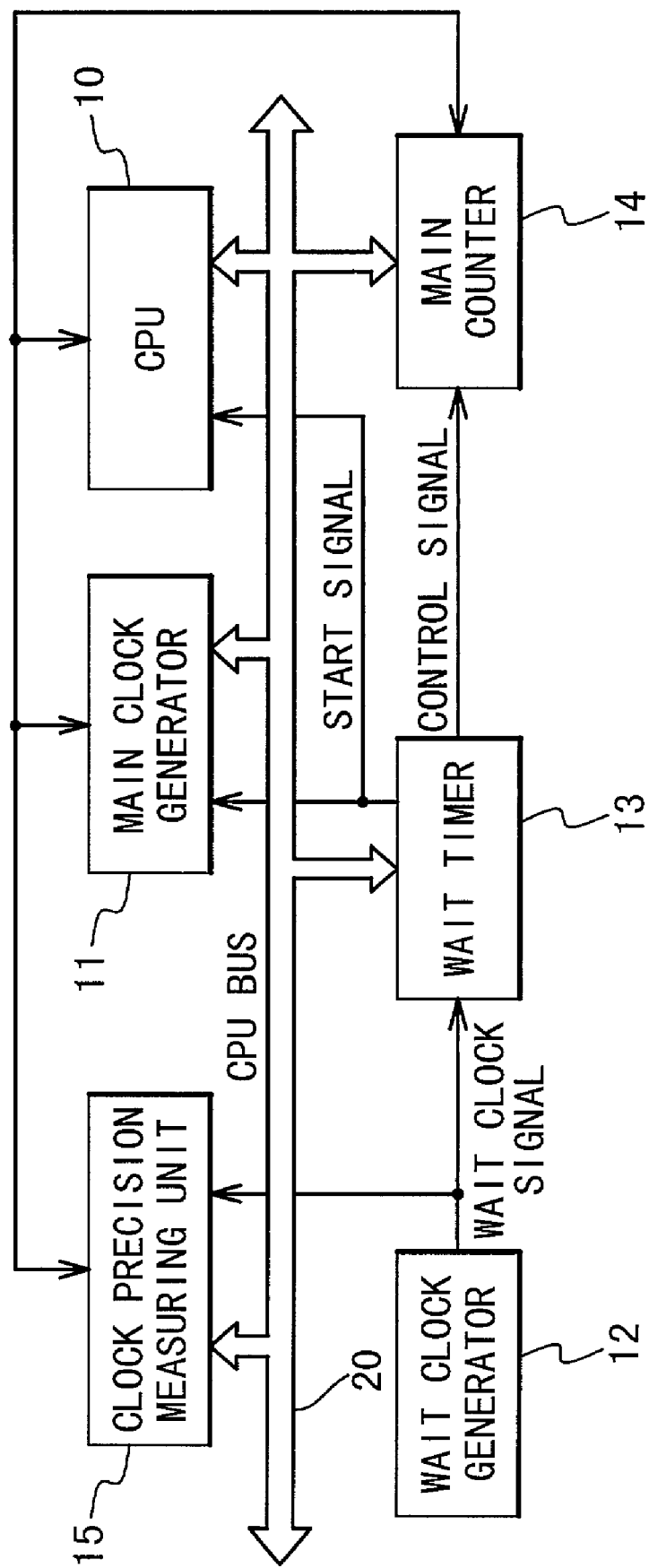
FIG. 2 is a block diagram showing the circuit structure of a mobile phone according to a first embodiment of the present invention.

FIG. 2 is a block diagram showing the circuit structure of the mobile phone according to the first embodiment of the present invention. The mobile phone is comprised of a CPU 10, a main clock generator 11, a wait clock generator 12, a wait timer 13, a main counter 14 and a clock signal precision measuring unit 15. A CPU bus 20 connects the CPU 10, the main clock generator 11, the wait timer 13, the main counter 14 and the clock signal precision measuring unit 15 mutually.

The CPU 10 controls the whole of the mobile phone. The processing carried out by the CPU 10 is described in detail later.

The main clock generator 11 generates a main clock signal to enable the whole operation of the mobile phone. The generation of the main clock signal is controlled based on a start signal outputted from the wait timer 13. The main clock signal generated by the main clock generator 11 is supplied to the CPU 10, the main counter 14 and the clock signal precision measuring unit 15. The main clock signal is a rectangular wave signal whose frequency is about 4 MHz, as shown in FIG. 4A. The main clock signal is kept a low level in a portion of the waveform shown in FIG. 4A, and the time interval in the low level is called a wait state in which the main clock signal is stopped and a waiting operation is carried out in the mobile phone.

The wait clock generator 12 generates a wait clock signal to control the waiting operation. The wait clock signal is called a real time clock signal, and is a rectangular wave signal whose frequency is about 32 KHz as shown in FIG. 3(B). Unlike the main clock signal, the wait clock signal is never stopped, and is always generated. The wait clock signal generated by the wait clock generator 12 is supplied to the wait timer 13 and the clock signal precision measuring unit 15.

The wait timer 13 operates based on the wait clock signal from the wait clock generator 12. The wait timer 13 generates the start signal when the time specified by the CPU 10 elapses. The wait timer 13 supplies the start signal to the CPU 10 and the main clock generator 11. The start signal is used to start the generation of the main clock signal by the main clock generator 11.

Also, the wait timer 13 generates and supplies a control signal to the main counter 14. The control signal is set to the low level when the wait timer 13 receives a wait timer start instruction from the CPU 10 and is set to a high level when the count of the wait timer 13 reaches a full value.

When the control signal is set to the low level, the main counter 14 becomes a hold state and stops the counting operation. In the hold state, it is possible to set a new count value to the main counter 14. Also, the main counter 14 restarts the counting operation from the set count value when the control signal is set to the high level.

Thus, the main counter 14 is used to manage the whole timings from the beginning of the communication to the end. The CPU 10 communicates with the base stations in accordance with the count value of the main counter 14. Although the main counter 14 sometimes is stopped as described later, the mobile phone is controlled in such a manner that the base station can recognize the main counter 14 being always operating.

The clock signal precision measuring unit 15 calculates the ratio RATIO of the frequency of the main clock signal from the main clock generator 11 to the frequency of the wait clock signal from the wait clock generator 12. The ratio RATIO calculated by the clock signal precision measuring unit 15 is sent to the CPU 10 through the CPU bus 20.

Next, the operation of the mobile phone configured as mentioned above will be described with reference to FIGS. 3 and 4. It should be noted that the change from an ordinary operation to the waiting operation in the sleep mode and the restart operation going out from the waiting operation to the waiting operation will be described mainly.

Figure 3:
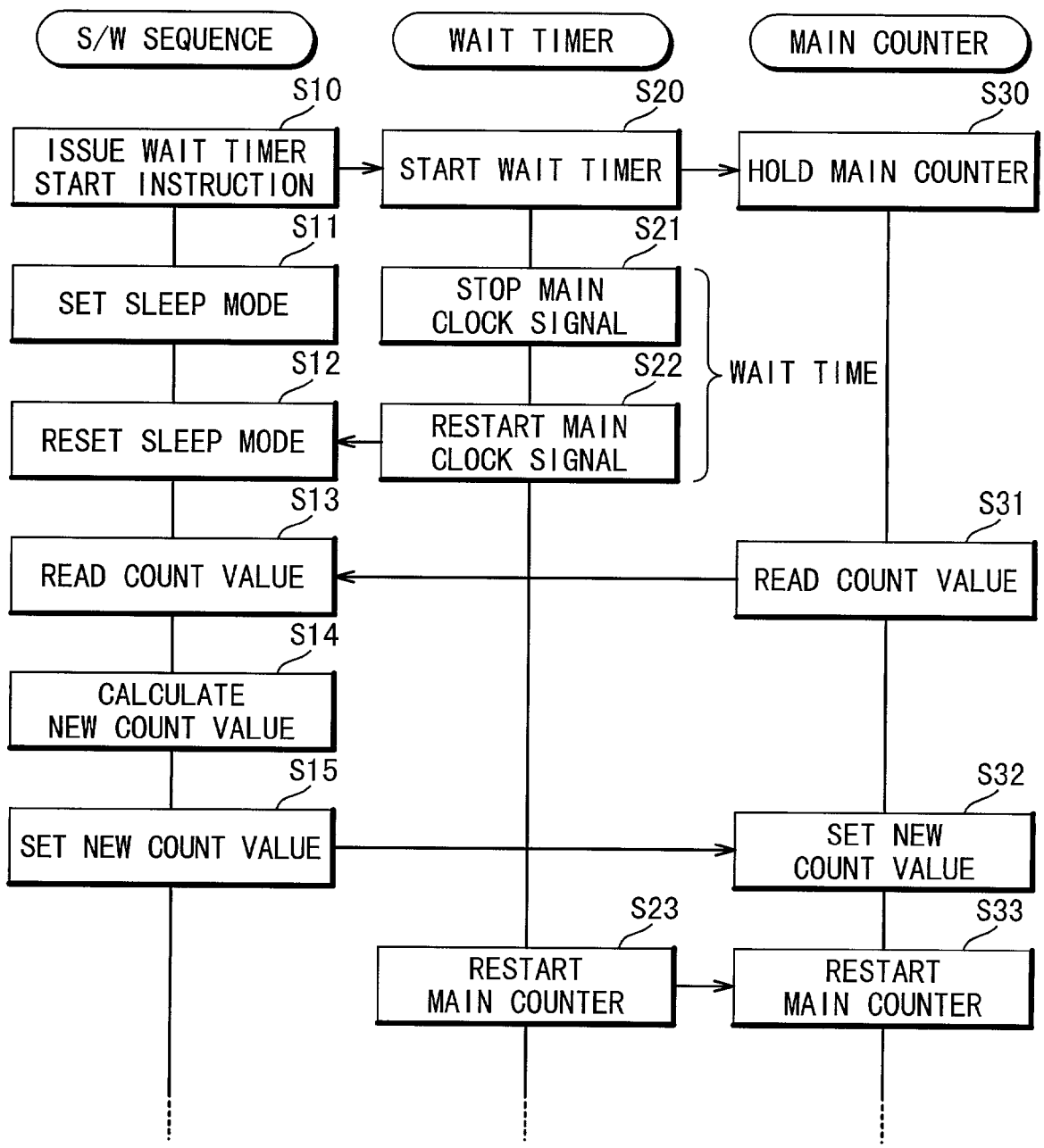
FIG. 3 is a flow chart to show the operation of the mobile phone in the first embodiment of the present invention.

The CPU 10 issues the wait timer start instruction to the wait timer 13 as shown at Step S10 of FIG. 3 when the CPU 10 enters the waiting operation. The wait timer start instruction is issued in a suitable timing before entering the waiting operation, as shown in the timing P2 of FIG. 4C. Also, the CPU 10 sends to the wait timer 13, data defining a time until the main clock signal is restarted, simultaneously with the issuance of the wait timer start instruction. The data is composed of the number WV of clocks of the wait clock signal.

The wait timer 13 is started in response to the issuance of the wait timer start instruction, as shown at Step S20 of FIG. 3. That is, as shown in FIG. 4D, when receiving the wait timer start instruction, the wait timer 13 starts the counting operation from the wait clock of the wait clock signal arriving after the timing P3 of FIG. 4C. At the same time, the wait timer 13 sets the control signal to the low level, as shown in FIG. 4F. Thus, the main counter 14 enters the HOLD state, as shown at Step S30 of FIG. 3. That is, the main counter 14 stops the counting operation, as shown in FIG. 4G, and holds the count value at the point.

After that, the wait timer 13 generates and supplies a sleep signal (not shown) to the CPU 10 and the main clock generator 11. Thus, as shown in FIG. 4A, the main clock signal is stopped (step S21) and the CPU 10 enters the sleep mode (Step S11).

Figure 4:
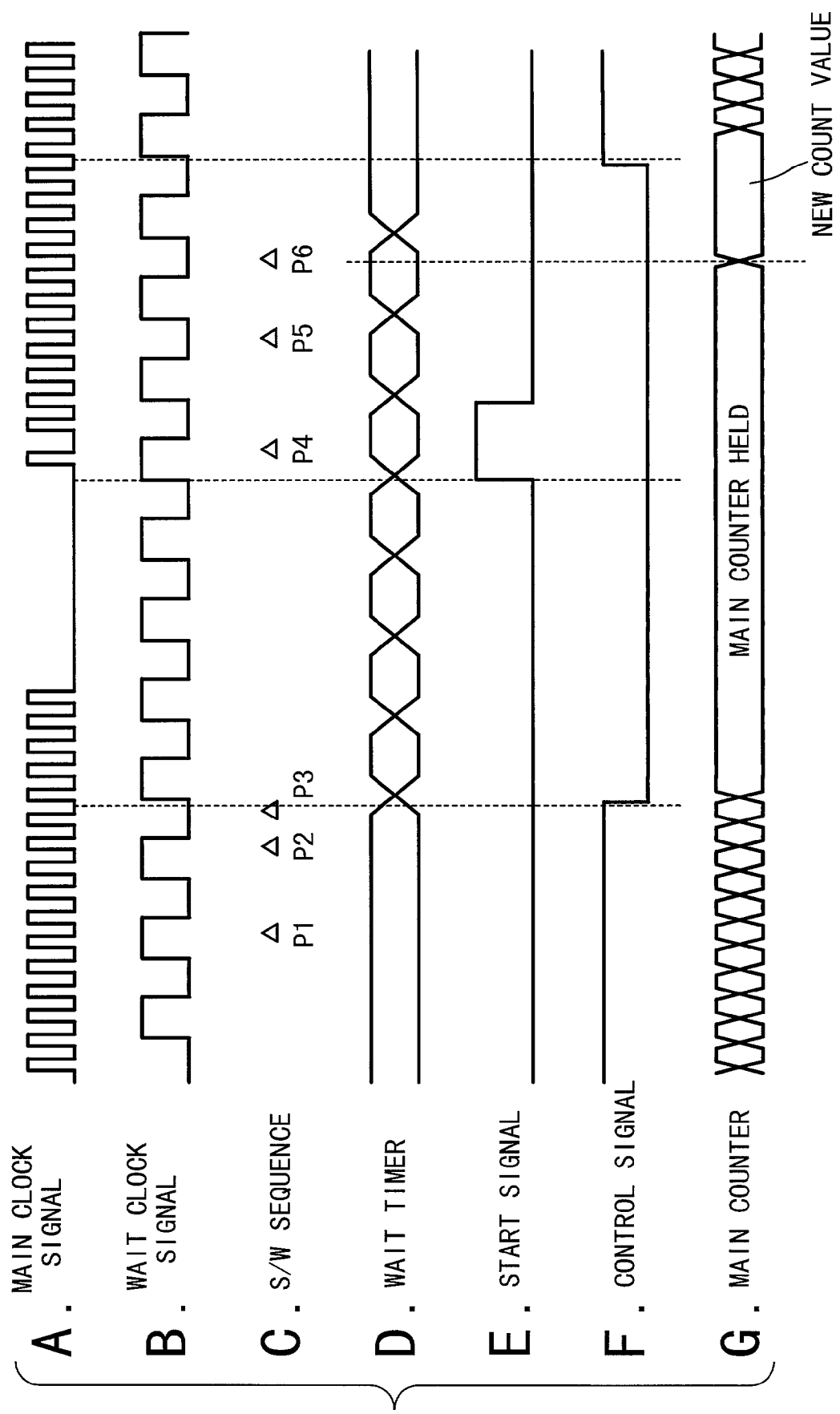
FIG. 4 is a diagram showing waveforms during the operation of the mobile phone in the first embodiment of the present invention.

The wait clocks sent while the main clock signal is stopped after the issuance of the wait timer start instruction are counted for the number WV by the wait timer 13. It is preferable that the number WV of wait clocks includes a loss for the restarting operation. When counting the wait clocks for the number MW, the wait timer 13 activates the start signal to the high level as shown in FIG. 4E, and sends to the CPU 10 and the main clock generator 11. In response to the start signal, the main clock generator 11 restarts the generation of the main clock signal as shown in FIG. 4A (Step S22). Also, the sleep mode of the CPU 10 is canceled at the timing P4 shown in FIG. 4 (Step S12). Thus, the CPU 10 restarts operation.

Next, when restarting the operation, the CPU 10 reads the count value held by the main counter 14 at the timing P5 of FIG. 4C (Step S13). That is, the main counter 14 sends the count value held at that time point to the CPU 10 via the CPU bus 20 (Step S31).

Next, the CPU 10 calculates a new counter value RV (Step S14). The new counter value RV is calculated in accordance with the following equation:

$$RV = HV + WV \times \text{RATIO}$$

where HV is a count value held by the main counter 14, WV is the number of wait clocks generated while the main counter 14 is stopped, and RATIO is the ratio of the frequency of the main clock signal previously measured by the clock signal precision measuring unit 15 to the frequency of the wait clock signal. For example, the calculation of ratio RATIO is carried out at the timing P1 of FIG. 4. The number of main clocks while the main counter 14 is stopped is calculated from the equation of "WV×RATIO".

Next, the CPU 10 sets the calculated new counter value RV to the main counter 14 at the timing P6 of FIG. 4C (Step S15). Thus, the new counter value RV is set to the main counter 14 (Step S32).

After that, when the wait timer 13 becomes full, the wait timer 13 sets the control signal to the high level and instructs the main counter 14 to restart (Step S23). Thus, the counting operation of the main counter 14 is restarted (Step S33). The count value of the main counter 14 at this time point is coincident with the count value which would be counted by the main counter 14 when the generation of the main clock signal is not stopped. Therefore, the following process can be is treated as the main clock signal is continuously outputted and the main counter 14 continues the counting operation.

Because the frequencies of the main clock signal and the wait clock signal are previously determined, the ratio RATIO of the frequencies of these clocks should be constant. However, the frequencies of the main clock signal and the wait clock signal change in accordance with the temperature and the voltage. It should be noted that the above mentioned measurement of the ratio RATIO of the frequency of the main clock signal to the frequency of the wait clock signal by the clock signal precision measuring unit 15 is carried out when a temperature detector or a voltage detector (both not shown) incorporated in the mobile phone detects the change in temperature or voltage.

The new counter value RV is calculated in accordance with the above calculation equation when the frequencies of the main clock signal and the wait clock signal change. There is a possibility that the calculated new counter value RV has an error for a few clocks because the main clock signal is high in frequency. When the error is generated, the mobile phone cannot keep the continuity of the count value of the main counter 14 and especially the mobile phone of the W-CDMA system will fall in the operation impossible state. Therefore, to prevent the error in the mobile phone according to the first embodiment, the ratio RATIO is calculated and is held by the clock signal precision measuring unit 15 when the temperature change or the voltage change is detected. The held ratio RATIO is used for the calculation of the new counter value RV. As a result, because any error is never contained in the calculated new counter value RV, the continuity of the count value of the main counter 14 is kept and the mobile phone can continue the normal operation.

As described above, according to the mobile phone in the first embodiment, when the present invention is applied to the mobile phone of the W-CDMA system, the power consumption can be suppressed because the continuity of the main counter can be kept even if the generation of the main clock signal is stopped in the waiting operation. Moreover, because it is not necessary to establish communication synchronization with the base station again, it is possible to reduce the process time after the waiting operation and suppression of the power consumption.

The mobile phone according to the second embodiment of the present invention has the main clock signal of 2 systems will be described.

Figure 5:
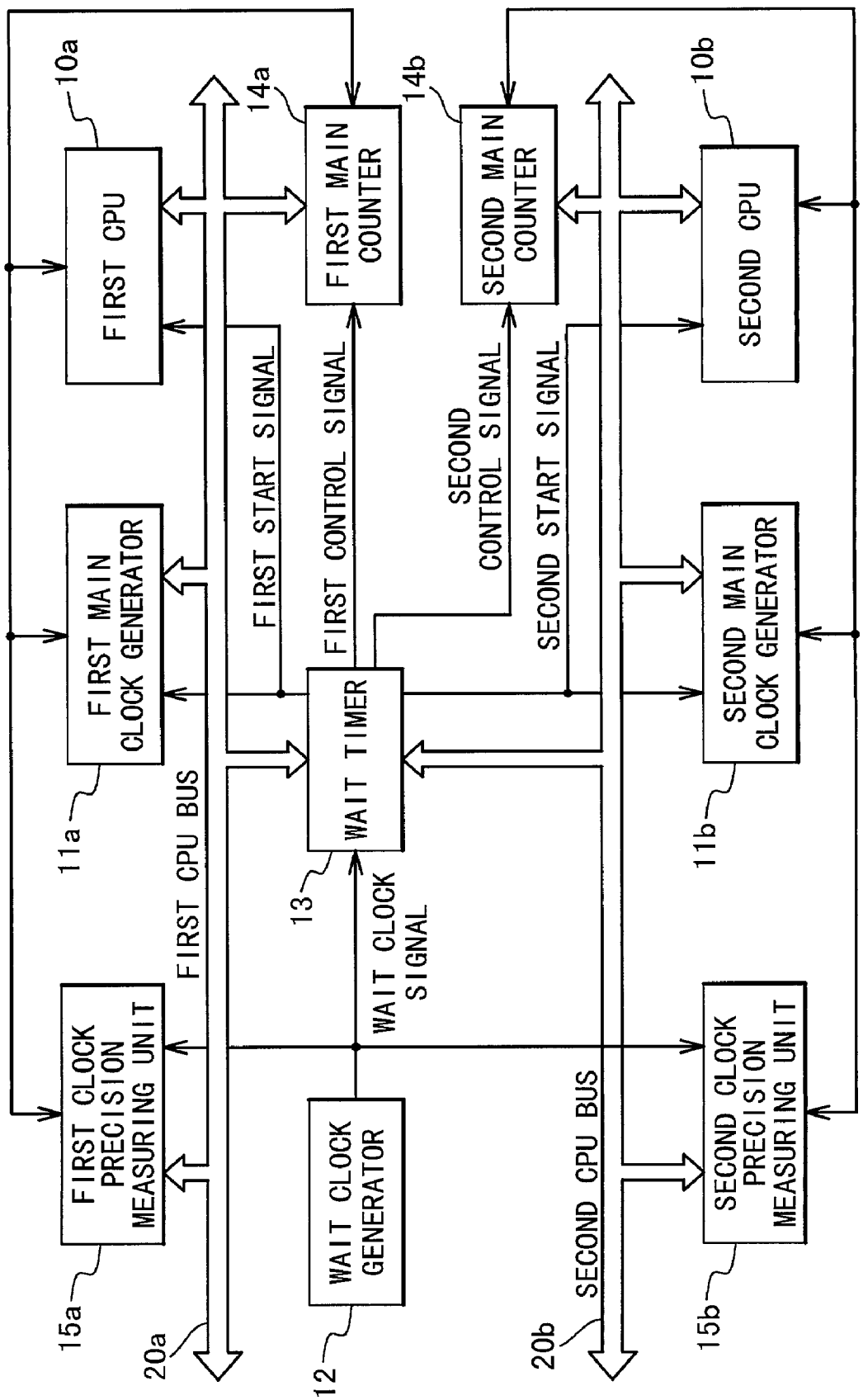
FIG. 5 is a block diagram showing the circuit structure of the mobile phone according to a second embodiment of the present invention.

FIG. 5 is a block diagram showing the circuit structure of the mobile phone according to the second embodiment of the present invention. The mobile phone is composed of a first CPU 10a, a first main clock generator 11a, a wait clock generator 12, a wait timer 13, a first main counter 14a, a first clock signal precision measuring unit 15a, a second CPU 10b, a second main clock generator 11b, a second main counter 14b, and a second clock signal precision measuring unit 15b. The first CPU 10a, the first main clock generator 11a, the first wait timer 13a, the first main counter 14a and the first clock signal precision measuring unit 15a are mutually connected by a first CPU bus 20a. Also, the second CPU 10b, the second main clock generator 11b, the second wait timer 13b, the second main counter 14b and the second clock signal precision measuring unit 15b are mutually connected by a second CPU bus 20b.

The first CPU 10a, the first main clock generator 11a, the wait clock generator 12, the wait timer 13, the first main counter 14a and the first clock signal precision measuring unit 15a of a first system section correspond to the CPU 10, the main clock generator 11, the wait clock generator 12, the wait timer 13, the main counter 14 and the clock signal precision measuring unit 15 in the first embodiment, respectively. The functions and operations of them are also the same as those of corresponding ones in the fist embodiment. Also, the second CPU 10b, the second main clock generator 11b, the wait clock generator 12, the wait timer 13, the second main counter 14b and the second clock signal precision measuring unit 15b of a second system section correspond to the CPU 10, the main clock generator 11, the wait clock generator 12, the wait timer 13, the main counter 14 and the clock signal precision measuring unit 15 in the first embodiment, respectively. The functions and operations of them are also the same as those of corresponding ones in the fist embodiment.

According to the mobile phone in the second embodiment, because two kinds of the main clock signals can be handled, there is an advantage that the generality further spreads. It should be noted that the main clock signal is not limited to two kinds and may be three or more kinds. In the case, the mobile phone having multiple system of main clock signal can be achieved by adding sets of the CPU, the main clock generator, the main counter and the clock signal precision measuring unit in accordance with the number of systems.

As described above in detail, according to the present invention, the mobile phone can be provided in which the power consumption can be suppressed and the process time after the waiting operation can be decreased.

What is claimed is:

1. A mobile phone having at least one main clock system and operating based on a main clock signal of said main clock system, wherein said main clock system comprising:
   a main counter configured to count main clocks of said main clock signal; and
   a power saving circuit configured to stop generation of said main clock signal for a time period, while counting wait clocks of a wait clock signal, to restart the generation of said main clock signal after the time period, and to control said main counter based on the counted wait clocks as if said main counter always counts said main clocks of said main clock signal,
   wherein said power saving circuit comprises:

a correction controller configured to count said wait clocks of said wait clock signal for the time period during which the generation of said main clock signal is stopped, and to correct a count value of said main counter based on the counted wait clocks, said correction controller comprises:

a single counter configured to count said wait clocks of said wait clock signal for the time period during which the generation of said main clock signal is stopped; and a calculator configured to calculate said main clocks while the generation of said main clock signal is stopped; and a setting circuit configured to correct the count value of said main counter based on the calculated main clocks.

2. The mobile phone according to claim 1, wherein said power saving circuit further comprises:

a stop controller configured to stop the generation of said main clock signal; and a restart controller configured to restart the generation of said main clock signal after said time period elapses, such that said main counter counts said main clocks from the corrected count value.

3. The mobile phone according to claim 1, wherein a frequency of said main clock signal is larger than a frequency of said wait clock signal.

4. The mobile phone according to claim 1, wherein the time period during which the generation of said main clock signal is stopped is predetermined.

5. The mobile phone according to claim 1, wherein said calculator comprises:

a ratio calculator configured to determine a frequency ratio of a frequency of said main clock signal to a frequency of said wait clock signal;

a CPU reading out a count value from said main counter when the generation of said main clock signal is stopped, and calculating said main clocks while the generation of said main clock signal is stopped, based on the counted wait clocks of said wait clock signal.

6. The mobile phone according to claim 5, further comprising:

a battery; and said ratio calculator calculates when a voltage of said battery changes.

7. The mobile phone according to claim 5, further comprising:

a temperature sensor; and said ratio calculator calculates when said temperature sensor senses change of a temperature of said mobile phone.

8. The mobile phone according to claim 1 comprising first and second main clock systems, each of which is same as said main clock system.

9. The mobile phone according to claim 8, wherein said wait clock signal is shared by said first and second main clock systems.

10. A mobile phone having at least one main clock system, said main clock system comprising:

a main clock generator which generates a main clock signal;

a single main counter which carries out a counting operation of main clock of said main clock signal in response to said main clock signal generated by said main clock generator; and a processor which stops the counting operation of said main counter by stopping the generation of said main clock by said main clock generator before entering a waiting operation and changes a count value of said main counter as if the counting operation of said main counter has been not stopped when going out of the waiting operation, said change is based upon a preset value include a ratio of the frequency of the main clock signal to the frequency of the wait clock signal.

wherein said processor comprises:

a wait timer which carries out a counting operation of wait clocks of a wait clock signal in response to a wait clock signal for a predetermined time corresponding to a time period during which the generation of said main clock signal is stopped; and a CPU which operates based on the count value of said main counter in response to said main clock signal, said CPU changes the count value of said main counter by adding data corresponding to the number of said main clocks while the counting operation of said main counter is stopped, to the count value of said main counter, said CPU calculates said data to be added, based on said wait clocks counted by said wait timer during said predetermined time, said processor further comprises:

a clock precision unit which holds a ratio of a frequency of said main clock signal to a frequency of said wait clock signal, and said CPU calculates said data by multiplying said wait clocks counted by said wait timer by said ratio held by said clock precision measuring unit.

11. A method of saving power consumption in a mobile phone having at least one main clock system and operating based on a main clock signal of said main clock system, wherein said method comprising;

(a) counting main clocks of said main clock signal using a first single counting means;

(b) stopping generation of said main clock signal for a time period, while counting wait clocks of a wait clock signal using a second single counting means;

(c) restarting the generation of said main clock signal after the time period; and (d) restarting the counting operation of said main clock of said main clock signal from preset data corresponding to said counted wait clocks of said wait clock signal, said preset data includes a ratio of the frequency of the main clock signal to the frequency of the wait clock signal, wherein said (b) restarting comprises:

(e) counting said wait clocks of said wait clock signal for the time period;

(f) calculating said preset data based on a count value of said main counter based on said counted wait clocks of said wait clock signal; and (g) setting said preset data, said (f) calculating comprises (h) determining the frequency ratio of a frequency of said main clock signal to a frequency of said wait clock signal;

(i) multiplying said counted wait clocks of said wait clock signal by said frequency ratio; and (j) adding the counted main clocks when the generation of said main clock signal is stopped, to the multiplying result.

12. The method according to claim 11, further comprising carrying said (h) determining when a voltage of a battery changes.

13. The method according to claim 11, further comprising carrying said (h) determining when a temperature of said mobile phone changes.

14. A mobile phone having at least one main clock system and operating based on a main clock signal of said main clock system, wherein said main clock system comprising:
- a main counter configured to count main clocks of said main clock signal;
- a wait counter configured to count wait clocks of wait clock signal;
- a precision measuring unit configured to calculate said frequency of ratio between said main clock signal and said wait clock signal; and
- a controller configured to stop and restart said generation of said main clock signal, and to reload a value to said main counter prior to restarting said generation of said main clock signal, wherein said value is calculated according to both the time period which said generation of said main clock is stopped and said frequency ratio between said main clock signal and said wait clock signal.

15. The mobile phone claimed in claim 14, further comprising:
- a temperature sensor,
  wherein said precision measuring unit calculates said frequency ratio between said main clock signal and said wait clock signal when temperature sensor detects temperature change.

16. The mobile phone claimed in claim 14, further comprising:
- a battery,
  wherein said precision measuring unit calculates said frequency ratio between said main clock signal and said wait clock signal when said battery detects the voltage change.

17. The mobile phone according to claim 14, wherein a frequency of said main clock signal is larger than a frequency of said wait clock signal.

18. The mobile phone according to claim 14, wherein the time period which the generation of said main clock signal is stopped is variable.

19. The mobile phone according to claim 14 comprising first and second main clock systems each of which is same as said main clock system.

20. A mobile phone according to claim 19, wherein said wait clock signal is shared by said first and second main clock systems.

* * * * *